United States Patent
Martin et al.

(10) Patent No.: US 7,863,362 B2
(45) Date of Patent: Jan. 4, 2011

(54) DENSITY-MATCHED POLYMER SLURRIES

(75) Inventors: Thomas J. Martin, Bixby, OK (US); Lu Chien Chou, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 1154 days.

(21) Appl. No.: 10/940,327

(22) Filed: Sep. 14, 2004

(65) Prior Publication Data
US 2006/0058437 A1 Mar. 16, 2006

(51) Int. Cl.
*C08L 91/06* (2006.01)
*C08K 5/01* (2006.01)
*C08K 3/20* (2006.01)
*C08J 3/22* (2006.01)
*C08G 73/10* (2006.01)
*C08F 2/44* (2006.01)

(52) U.S. Cl. .................. 524/275; 524/477; 524/487; 524/475; 524/474; 524/847; 524/849

(58) Field of Classification Search ............... 524/275, 524/477, 487, 475, 474, 847, 849
See application file for complete search history.

(56) References Cited

U.S. PATENT DOCUMENTS

| | | | |
|---|---|---|---|
| 4,084,993 A | 4/1978 | Cook |
| 4,384,616 A | 5/1983 | Dellinger |
| 4,584,244 A | 4/1986 | Fenton |
| 4,720,397 A | 1/1988 | O'Mara et al. |
| 4,789,383 A | 12/1988 | O'Mara et al. |
| 4,826,728 A | 5/1989 | O'Mara et al. |
| 4,837,249 A | 6/1989 | O'Mara et al. |
| 5,165,440 A | 11/1992 | Johnston |
| 5,165,441 A | 11/1992 | Mitchell |
| 5,244,937 A | 9/1993 | Lee et al. |
| 5,376,697 A | 12/1994 | Johnston et al. |
| 5,449,732 A | 9/1995 | Smith et al. |
| 5,504,131 A | 4/1996 | Smith et al. |
| 5,504,132 A | 4/1996 | Smith et al. |
| 5,539,044 A | 7/1996 | Dindi et al. |
| 5,582,250 A | 12/1996 | Constein |
| 5,961,804 A | 10/1999 | Jacobson et al. |
| 6,039,932 A | 3/2000 | Govind et al. |

(Continued)

FOREIGN PATENT DOCUMENTS
EP 0 932 651 B1 8/1999

(Continued)

Primary Examiner—William K Cheung
(74) Attorney, Agent, or Firm—Mossman Kumar & Tyler PC

(57) ABSTRACT

Polymer slurries of ultrahigh molecular weight polyalpha-olefins are made stable toward settling, separation and agglomeration by surface treatment with a combination of wax and optional relatively high-density particulates. The selection of the surface coating acts not only as an anti-blocking agent, or partitioning aid to keep the tacky polymer particles separated, but also provides the suspended polymer particle with a density that matches the carrier. This prevents separation of the slurry components over time. Such materials, ultimately used as pipeline additives to reduce the fluid drag and increase the volumetric throughput, can be stored and shipped for extended periods of time without degradation of the slurry quality. Upon injection into the pipeline, the polymer particle dissolves quickly, unhindered by the coating.

18 Claims, 2 Drawing Sheets

U.S. PATENT DOCUMENTS

| | | |
|---|---|---|
| 6,126,872 A | 10/2000 | Kommareddi et al. |
| 6,160,036 A | 12/2000 | Kommareddi et al. |
| 6,172,151 B1 | 1/2001 | Johnston et al. |
| 6,399,676 B1 | 6/2002 | Labude et al. |
| 6,576,732 B1 | 6/2003 | Milligan et al. |
| 6,596,832 B2 | 7/2003 | Johnston et al. |
| 6,649,670 B1 | 11/2003 | Harris et al. |
| 6,939,902 B2 * | 9/2005 | Smith et al. ................. 523/175 |
| 7,256,224 B2 | 8/2007 | Martin et al. |
| 2003/0013783 A1 | 1/2003 | Kommareddi et al. |
| 2003/0065054 A1 | 4/2003 | Smith et al. |
| 2003/0109397 A1 | 6/2003 | Aouad et al. |
| 2003/0187123 A1 | 10/2003 | Labude et al. |

FOREIGN PATENT DOCUMENTS

| | | |
|---|---|---|
| WO | WO 2004/018834 A1 | 3/2004 |
| WO | WO 2005/100846 A1 | 10/2005 |

* cited by examiner

DENSITY-MATCHED POLYMER SLURRIES

FIELD OF THE INVENTION

The invention relates to processes for producing and using polymeric drag reducing agents, and most particularly to processes for providing and using polymeric drag reducing agents in a form that is stable during storage, handling and shipping.

BACKGROUND OF THE INVENTION

The use of polyalpha-olefins or copolymers thereof to reduce the drag of a hydrocarbon flowing through a conduit, and hence the energy requirements for such fluid hydrocarbon transportation, is well known. These drag reducing agents or DRAs have taken various forms in the past, including slurries or dispersions of ground polymers to form free-flowing and pumpable mixtures in liquid media. A problem generally experienced with simply grinding the polyalpha-olefins (PAOs) is that the particles will "cold flow" or stick together after the passage of time, thus making it impossible to place the PAO in the hydrocarbon where drag is to be reduced, in a form of suitable surface area, and thus particle size, that will dissolve or otherwise mix with the hydrocarbon in an efficient manner. Further, the grinding process or mechanical work employed in size reduction tends to degrade the polymer, thereby reducing the drag reduction efficiency of the polymer.

One common solution to preventing cold flow is to coat the ground polymer particles with an anti-agglomerating or partitioning agent. Cryogenic grinding of the polymers to produce the particles prior to or simultaneously with coating with an anti-agglomerating agent has also been used. However, some powdered or particulate DRA slurries require special equipment for preparation, storage and injection into a conduit to ensure that the DRA is completely dissolved in the hydrocarbon stream. The formulation science that provides a dispersion of suitable stability such that it will remain in a pumpable form necessitates this special equipment.

Gel or solution DRAs (those polymers essentially being in a viscous solution with hydrocarbon solvent) have also been tried in the past. However, these drag reducing gels also typically demand specialized injection equipment, as well as pressurized delivery systems. The gels or the solution DRAs are unstable with regard to quality and have a defined set of conditions that have to be met by mechanical equipment to pump them, including, but not necessarily limited to viscosity, vapor pressure, undesirable degradation due to shear, etc. The gel or solution DRAs are also limited to about 10% polymer as a maximum concentration in a carrier fluid due to the high solution viscosity of these DRAs. Thus, transportation costs of some conventional DRAs are considerable, since up to about 90% of the volume being transported and handled is inert material.

From reviewing the many prior patents it can be appreciated that considerable resources have been spent on both chemical and physical techniques for easily and effectively delivering drag reducing agents to the fluid that will have its drag or friction reduced. Yet none of these prior methods has proven entirely satisfactory. Thus, it would be desirable if a drag reducing agent could be developed which is stable during storage, transportation and handling, that is, does not separate out the DRA particles.

SUMMARY OF THE INVENTION

An object of the invention is to provide a polymer drag reducing agent product where the DRA particles do not separate out over time, such as when the product is stored prior to delivery.

An additional object of the invention includes providing a polymer DRA particle product for ready dissolution and dissipation in a flowing hydrocarbon stream.

Another object of the invention is to continuously produce a polymer DRA product that can be readily transported and introduced into a hydrocarbon fluid without the need for equipment more specialized than that presently being used.

In carrying out these and other objects of the invention, there is provided, in one form, a density-matched particle slurry that includes a carrier liquid and a plurality of core particles within the carrier liquid. The core particles further include a density-matching material on the surfaces of the core particles where a majority of the density-matched core particles bearing the density-matching materials to have a combined density substantially equal to that of the carrier liquid. The density-matching may be located upon, adherent to, affixed upon or otherwise connected to the core particle surfaces. By "substantially equal to" is meant that the densities are sufficiently the same to improve the stability of the slurry. As will be discussed, as a practical matter it is close to impossible to exactly match the combined density of all of the particles bearing the density-matching materials with the carrier liquid, such as over a broad temperature range or over an ambient temperature range, but substantial improvement may be achieved.

In an alternate non-limiting embodiment of the invention, there is provided a method for forming a density-matched particle slurry that includes suspending core particles in a carrier liquid that is a non-solvent for the core particles. Finely divided bits of a density-matching material are added to the slurry, where the density-matching material is not soluble in the carrier liquid. The slurry is heated at or above the point where the finely divided bits dissolve or disperse in the carrier liquid but below a point to cause decomposition of any component. The slurry is subsequently cooled to ambient temperature to precipitate the density-matching material on at least a majority of the core particles.

In another non-limiting embodiment of the invention, there is offered a hydrocarbon-containing stream having reduced drag that includes a hydrocarbon and a density-matched particle slurry. The density-matched particle slurry in turn includes a carrier liquid and a plurality of core particles within the carrier liquid. The core particles are soluble in the hydrocarbon. The density-matched particle slurry also includes a density-matching material placed on the surfaces of the core particles in a manner sufficient to permit the density of a majority of the density-matched core particles bearing the density-matching materials to have a combined density substantially equal to that of the carrier liquid. The density-matching material is also soluble or dispersible in the hydrocarbon.

Any of the embodiments mentioned above may optionally include relatively high-density particulates in the precipitated density-matching material.

DETAILED DESCRIPTION OF THE INVENTION

Figure 1:
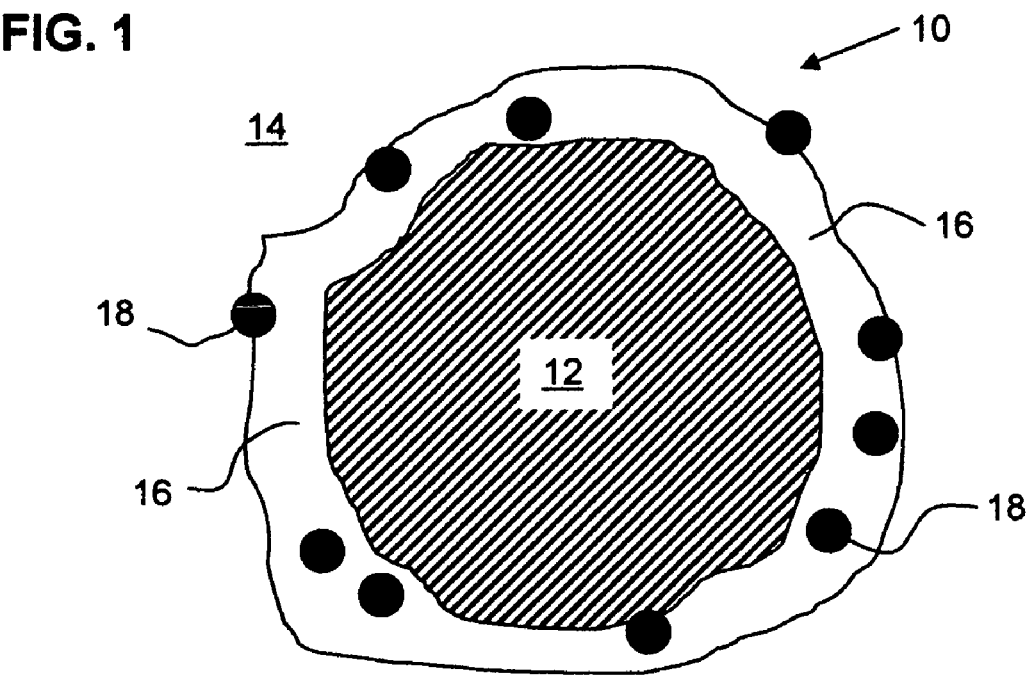
FIG. 1 is a schematic cross-section of a density-matched particle in a carrier liquid to form a slurry, showing a density

A fluid polymer slurry has been discovered as an improved pipeline drag reducer additive that is stable toward settling, separation, syneresis, and agglomeration. The DRA (drag reducing agent) polymer particles are coated with a wax component that may optionally contain embedded, high density particulates. The proportions of DRA polymer to wax to high density particulates are adjusted such that the resulting composite particle has the same density as the carrier fluid or liquid. The utility and performance of the drag reducer product is not sacrificed by this improved product composition. It will be appreciated that the compositions and methods of this invention may apply to other core particles besides DRA polymers, however, the particular, non-limiting embodiment referred to herein will typically refer to the core material as DRA polymer.

The compositions of matter where the core material is a DRA polymer are useful as pipeline additives to reduce the fluid drag and increase the volumetric transfer rate of the transported stream. This additive is typically metered into the flowing liquid within the pipeline over a period of time, e.g., days, weeks, or months, which is similar to the timeframe for storage and transportation to the point of use. Therefore, it is desirable for this material to be fluid to allow for easy transfer and injection, but not separate and become macroscopically inhomogeneous (e.g., settling, floating, or otherwise destabilize, possible accompanied by agglomeration to form chunks that plug filters or will not flow through pipes). Ideally, a homogeneous suspension of fine particles with low viscosity is desired.

A common practice in the industry to minimize settling of a drag reducer slurry is to match the suspended particle density to the carrier density by using a combination of carrier components in a proportion such that the overall carrier mixture density equals the suspended particle density. The drawback of this practice is that there are limited carriers available at economical costs that have both the proper densities and hydrophobic/hydrophilic properties. The present invention differs from the state of the art in that the particle density is matched to that of the carrier (rather than vice versa) such that a large number of options for materials exists, and that the selection of carrier is based on other desired properties, without the need to specify density of the liquid or carrier.

The drag reducing agent (DRA) polymer, used in many types of crude oil and in refined products such as gasoline and diesel fuels, is a an ultra-high molecular weight polyalphaolefin polymer or copolymer. Such materials, formed by various methods as granules or particulates during manufacture, tend to "cold flow" together to produce irreversible agglomerates, even as slurries of polymer particles suspended in non-solvents. A surface treatment must be applied to the polymer particles as an "anti-blocking agent" to prevent this cold flow action, and as a wetting agent to provide for compatibility with the non-solvent. The current invention specifies anti-blocking agents which simultaneously also act to give the entire polymer particle the same density as the suspending media (liquid carrier), thereby reducing or eliminating settling and separation of the polymer slurry.

To be effective upon injection into the pipeline, the coated drag reducer polymer particle must dissolve quickly, given that a polymeric drag reducer is effective only when fully dissolved as a large, random polymer coil in solution. Therefore, the coating agent must not inhibit dissolution while performing as a suspension aid and anti-blocking agent. Additionally, shear degradation must be avoided, which is another reason, in addition to low viscosity, that transferring products as slurries is preferred. Transferring polymer solutions, or gels, will degrade the polymer over time and lower its effectiveness at drag reduction.

Referring to FIG. 1, the general procedure for producing density-matched particle slurries of this invention may involve suspending ground, chopped or precipitated DRA polymer core particles 12 in a non-solvent 14. Non-solvents are understood herein to include poor solvents, or solvents that may only swell the DRA polymer without fully dissolving it. An additive such as a wax in the form of finely divided bits or particles, and possibly other particulate materials generally with a diameter much smaller than the DRA polymer particle, are added to the polymer slurry. The wax is not soluble in the non-solvent at ambient temperatures. In the context of this invention, ambient temperatures are understood to be temperatures at which the density-matched particle slurries are normally stored, transported, or consumed. Ambient temperature should not be confused with room temperature since ambient temperature can vary over a much wider range. In one non-limiting embodiment of the invention, ambient temperature may range from about −40° F. to about 120° F. (about −40° C. to about 49° C.). In another non-restrictive embodiment of the invention, the lower end the of ambient range may be about −20° F. (about −29° C.) and alternatively the upper end of the ambient range may be about 100° F. (about 38° C.) The slurry with added polymer is then heated to above ambient temperatures, at which point the wax dissolves or disperses in the carrier, but not to a temperature so high as to cause decomposition of any component. The heating step can be accompanied by, or the result of, a grinding operation (or other size reduction method) meant to reduce the size of the suspended polymer particles 12. At least part of the heat to disperse the wax may be provided by grinding or other size reduction. After a sufficient time, the slurry is cooled to ambient temperatures and allowed to "age" or "set" as the wax 16 precipitates out of solution onto the DRA polymer surface carrying with it the relatively high density particulate material 18, if present, to the polymer surface, to form density-matched particles 10. Precipitation is used as a general term to include both precipitation (disordered solidification from solution) and crystallization (ordered solidification from solution).

The recipe of ingredients is chosen such that the DRA polymer/wax/(optional) particulate material composite has the same density or substantially the same density as the carrier liquid, producing a non-settling, non-separating slurry despite or irregardless of the slurry solids content or the DRA polymer particle size. In other words, flexibility is introduced into the slurry formulation, allowing for wide variation in total solids and polymer particle size, without sacrificing stability.

In general, the DRA polymer can be obtained from solution polymerization of an alpha olefin monomer or a mixture of olefinic monomers, or from bulk polymerization (no solvent) of said monomer(s). The DRA polymer can be subsequently made into particulate form by cutting, chopping, grinding, comminuting, homogenizing or other size reduction technique at ambient temperatures or cryogenic temperatures, or by precipitation from solution by addition of a non-solvent component. Mixtures of polymer solids from both sources can be used. Solution polymerization followed by precipitation is the process used for FLO® XL DRA production. FLO® XL DRA is available from Baker Petrolite. The intermediate FLO® XL wet cake, formed by filtration of the precipitated polymer, is one non-restrictive source of polymer for this invention. Bulk polymerization followed by granulation and grinding is the process for FLO® MX DRA production. This is likewise a source for DRA polymer for the present invention.

It should also be understood that although reference is made to polyalphaolefins as a suitable drag reducer for hydrocarbon fluids that the invention is not limited to these particular polymers, but that other polymers known to reduce drag or friction in hydrocarbons may be used in the compositions and methods of this invention. It must also be understood that "drag reduction" includes, but is not necessarily limited to, any reduction, decrease, retardation, controlling, inhibiting, suppression, or other lowering of the effects of friction or drag of hydrocarbon flowing through a pipeline and/or power requirements for transporting a hydrocarbon (or other liquid) through a pipeline. It is not necessary for drag or friction to be completely eliminated using the compositions and methods of this invention, nor for drag or friction to be reduced or lowered by any particular amount for the invention to be considered successful.

The density-matching material or wax component 16 may be a polyethylene glycol (PEG) or polypropylene glycol (PPG) homopolymer or copolymer, or a stearate monoester or stearate diester of these homopolymers or copolymers. Suitable density-matching material or wax components 16 also include, but are not necessarily, limited to, an alcohol or fatty alcohol ethoxylate with variable alcohol and ethoxylate chain lengths, or similar alcohol propoxylate, or a mixture of EO/PO alcohol ethers; or stearic acid or salts; oleic acid or salts of these materials. In one non-limiting embodiment of the invention the alkoxylated chain length may range from about 8 to about 400 alkoxy units, and alternatively from about 100 to about 200 alkoxy units. In another non-restrictive embodiment, the alcohol moieties may have from about 1 to about 60 carbon atoms, and alternatively from about 12 to about 20 carbon atoms. Other suitable waxes or density-matching materials include, but are not necessarily limited to, stearamide; ethylene bis-stearamide; ethylene glycol distearate; or fatty acid esters and fatty acid ethoxylates. A significant wax property is that it is fully or partially soluble in the carrier at elevated temperatures and not soluble at ambient temperatures, as defined previously. A mixture of waxes or wax types can be used. Waxes that form a crystalline phase when solidified are particularly useful in some embodiments. Waxes with a large PEG component are useful in other embodiments or applications.

Referring to FIG. 1, the relatively high density particulates 18, if used, can vary widely and may include, but are not necessarily limited to, polyolefin homopolymers and copolymers of various densities; oxidized polyethylene (PE); polystyrene and copolymers thereof; carbon black and graphites; micronized polyphenylene sulfate (PPS), polyphenylene oxide (PPO), polyamides, polyethylene terephthalate (PET), polybutylene terephthalate (PBT), polyvinyl chloride (PVC); precipitated and fumed silicas; natural or synthetic clays, and organoclays; boric acid; magnesium, calcium and barium phosphates, sulfates, carbonates or oxides and other sulfates, carbonates and oxides of alkali earth metals. It should be recognized that the "wax" or density-matching components 16 may function as a "particulate" when cooled to ambient temperatures, which implies that all the wax types listed above can be included as examples of "relatively high density particulates" 18 in this section. This is also a reason that separate, relatively high density particulate species may not be required to achieve a density-matched slurry. In one non-limiting embodiment, when relatively high density particulates are used, the wax or density-matching material and the relatively high density particulates are different.

In general, and in one non-restrictive embodiment of the invention, the properties of the relatively high density particulates are that they are (1) small, $1/10$th to $1/100$th the diameter of polyalpha-olefin (PAO) or core particle, (2) non-soluble in the carrier at ambient temperatures, and (3) their density is greater than the carrier, typically greater than 1 g/cc. Group IIA metal sulfates and phosphates are useful in one particular embodiment of the invention. Calcium sulfate (average particulate size, 19 μm) is more preferred. There is no reason to expect that mixtures of particulate types cannot work similarly. In one non-limiting embodiment of the invention, the relatively high density particles range have an average particle size ranging from about 0.25 to about 20 μm, and in another non-restrictive form, ranging from about 12 to about 22 μm.

The non-solvent (carrier liquid) in some non-restrictive embodiments of the invention may include, but are not necessarily limited to, non-hydrocarbon components including, but not necessarily limited to, water or aqueous solutions of various pH and ionic strengths, alcohols and fatty alcohols, glycols and diols, glycol ethers, glycol esters, or mixtures of these. The carrier properties are not specifically defined unless there is a particulate component used (in addition to the wax) to balance the density, in which case the carrier must have a density less than the density of the particulates. Butyl cellosolve, hexanol, water, and hexylene glycol are useful in some embodiments of the invention, and hexylene glycol is particularly helpful in some applications. Alternatively, in the case where the core particulate is ultimately to be soluble in a substantially non-hydrocarbon system, e.g. water or an aqueous stream flowing through a pipeline, the carrier liquid for the slurry of this invention may be a hydrocarbon fluid. The bulk or majority of the carrier fluid may be any of the above materials, or alternatively a blend of like materials, such as a blend of one or more alcohols with one or more glycols and the like. The carrier fluid may also optionally have minor amounts of dissolved components including, but not necessarily limited to, acids, bases, salts, polymeric thickeners, biocides, etc., which are typical additives for DRA slurries.

In one non-restrictive embodiment the density for polyalpha-olefins is less than the water carrier (i.e., 0.8-0.9 g/cc, vs. 0.99 g/cc for water). Therefore, the density of the wax and particulate components must be greater than water to balance or match the density of water. Typically, but not always, the density of the relatively high density particulate is greater than the wax. In general, in equation form:

$$\text{density DRA polymer} < \text{density carrier} < \text{density of wax}$$

and $$\text{density DRA polymer} < \text{density carrier} < \text{density of particulate}$$

It is difficult to specify in advance what suitable proportions of the various components might be since the precise proportions would depend on a number of factors, including, but not limited to, temperature, the nature and density of the carrier liquid, the nature and density of the core particles, which may be a polymer, the nature and density of the wax or density-matching material, and the nature and density of the relatively high density particulates, if used. Nevertheless, in another non-restrictive embodiment of the invention, the proportion of the wax and the relatively high density particulates are given in terms of phr (parts per hundred parts resin or rubber, which in this case is the polymer core material) commonly used in formulation work. These proportions can vary widely depending on the densities of the materials, but to give a general sense, the wax or density-matching material may range from about 2 to about 55 phr, and the relatively high density particulates may range from 0 to about 40 phr. In another, alternate embodiment, the wax or density-matching material may range from about 4 to about 25 phr, and the relatively high density particulates may range from 0 to about 36 phr. In another non-restrictive version, the wax or density-matching material may range from about 5 to about 12 phr, and the relatively high density particulates may range from 0 to about 14 phr.

Figure 2:
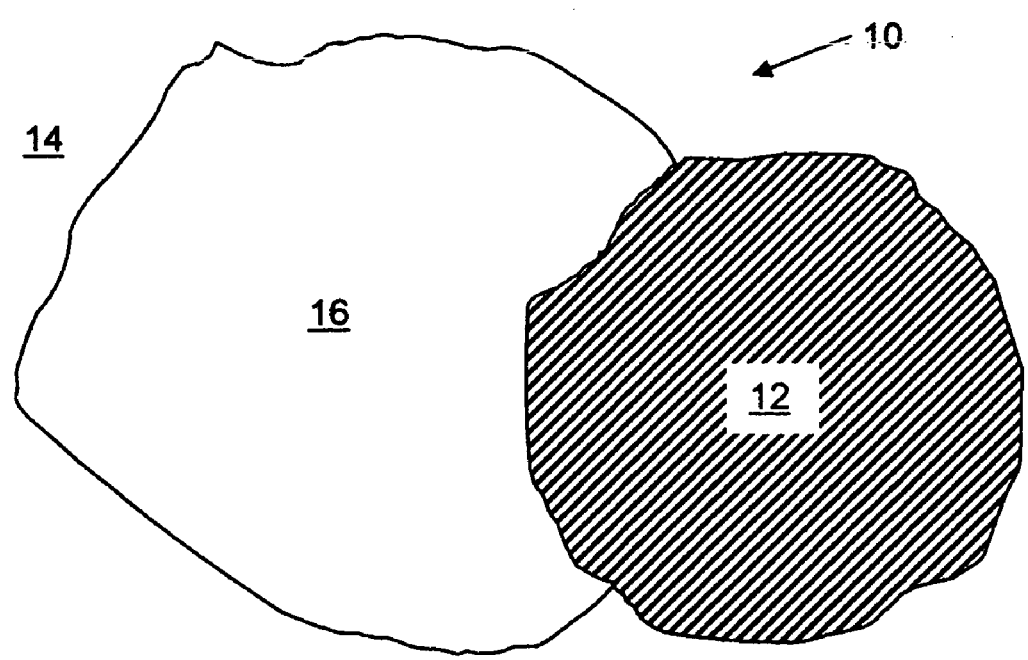
- FIG. 2 is a schematic cross-section of a density-matched particle where the density-matched material does not completely surround the core particle, and no high density particulates are used.

In one non-limiting embodiment the density-matching materials or wax is precipitated on at least a majority of the total surface area of the core or polymer particles. It will be appreciated that it is not necessary that the wax or density-matching material to completely cover or encapsulate all of the surface area of each core particle contacted, or necessarily a majority of the surface area of each core particle for the invention to be considered successful. For instance, a configuration such as that shown in FIG. 2 would still have the effect of the combined density of 12 and 16 substantially equal to that of the fluid or carrier 14.

The invention will now be described with respect to certain more specific Examples which are not intended to limit the invention in any way, but are used to more fully illustrate it in various particular embodiments.

In general, a typical composition may have the following makeup, where the final recipe is dependant on the densities of each component. The preferred compositions vary significantly with carrier of differing densities. Examples are given below which illustrate the invention in more detail.

TABLE I

Typical Density-Matched Slurry Component Ranges

| Component | Broad Range | Preferred Range |
|---|---|---|
| polyalpha-olefin (DRA) polymer | 10-40% (w/w) | 20-25% (w/w) |
| wax* | 1-30% | 5-15% |
| particulate* | 0-20% | 0-10% |
| carrier* | balance | balance |

*carrier may be a single component or a mixture

Example 1

A 2 g sample of Ritapeg 150DS (polyethylene oxide 150 distearate ester, or "wax," from Rita Corporation) was added to 58 g Dowanol PnB (propylene glycol n-butyl ether, from Dow Chemical) and heated to 120° F. (49° C.) to dissolve the wax. Separately, 19.9 g of Microthene F (polyethylene copolymer, average particle size 25 μm, from Equistar) was added to 100 g Dowanol PnB. A 100 g quantity of precipitated polyalpha-olefin (PAO) polymer (as a wet cake containing residual glycol, stearate salts, etc.) was added to the Microthene slurry under high shear at ambient temperature. The shear was provided by a 1" (2.54 cm) Cowels blade run at 2000 rpm for 5 min. The wax solution was added secondarily to the polymer slurry under high shear. The mixture was allowed to stand and cool to ambient temperature for one hour. The resulting slurry had a water-like viscosity and showed no signs of separation after sitting unagitated for 7 months. The slurry was observed to dissolve rapidly in hexane, giving a "stringy" solution within 5 min. The average particle size was 180 μm and the percent dissolution was found to be 32%.

Example 2

A similar preparation method as Example 1 was prepared with the omission of the Microthene (particulate) component. The resulting slurry was unstable and separated overnight, giving a clear lower phase with an opaque upper layer of PAO polymer.

Example 3

Figure 3:
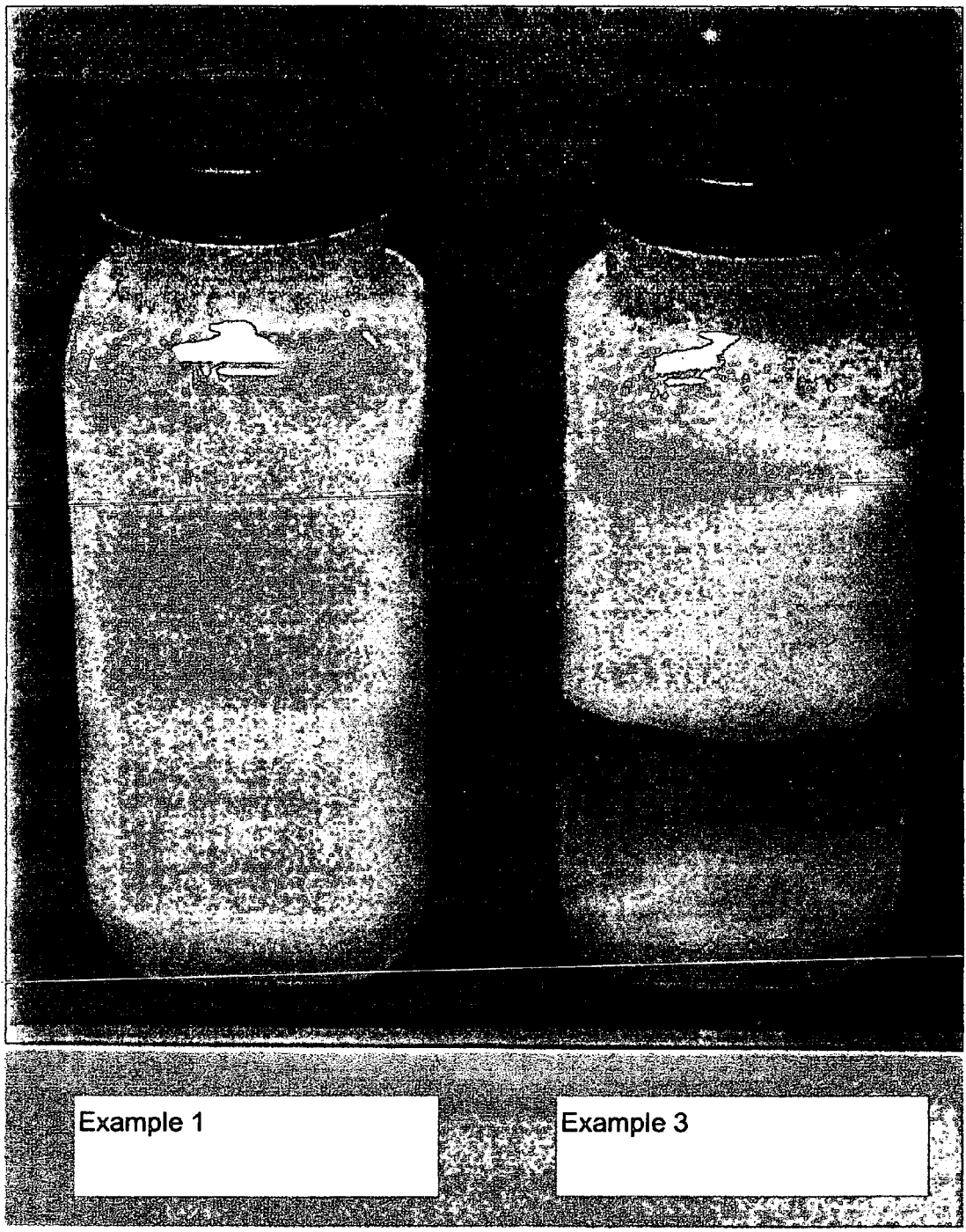
FIG. 3 is a photograph comparing a stable, inventive slurry composition of Example 1 with the unstable slurry of Example 3 that has no precipitated wax on the core polymer particles.

The same preparation method as Example 1 was prepared with the omission of the Ritapeg 150 DS (wax) component. This slurry separated quickly giving a clear middle layer with a lower layer of white solids (Microthene) and an opaque upper layer of DRA polymer. Examples 1 and 3 are shown in the attached pictures of FIG. 3.

Example 4

A similar preparation method as in Example 1 was prepared with the substitution of carbon black (N231 from Cabot) for the Microthene component. The resulting black slurry has a low viscosity and showed little separation after sitting unagitated for several weeks.

Example 5

A 10.6 g quantity of Ritapeg 150 DS (wax) was dissolved in 222 g of hexylene glycol (2-methyl-2,4-pentanediol) at 65° C. A 111 g quantity of precipitated PAO polymer (as a wet cake containing residual glycol, stearate salts, etc.) was added to the dissolved wax solution. A 10.6 g quantity of $CaSO_4$ dihydrate was added to the mixture and ground with a Waring-type blender for 30 seconds. The homogenized slurry, still hot, was allowed to cool to ambient temperatures while under agitation. The resulting density-matched particles had an average particle size of 193 μm, and the slurry had a viscosity of 740 cP (0.74 Pa-s). No separation was observed after sitting at ambient temperatures overnight. The slurry was observed to dissolve rapidly in hexane, giving a "stringy" solution within 5 min. Percent dissolution was found to be 85%.

Example 6

The same preparation was followed as with Example 5 with the omission of the wax. Significant separation was observed, with the $CaSO_4$ sitting on the bottom of the container and the DRA polymer floating.

Example 7

A 1456 g quantity of hexanol and 243 g quantity of dipropylene glycol monomethyl ether were charged to a high-shear grinder. A 167 g quantity of an alkyl amide wax (average particle size 17 μm) was added along with 668 g of a ultra high molecular weight PAO copolymer made by a bulk polymerization process. The mixture was ground until the particle size was less than 300 μm while the temperature rose to 140° F.

(60° C.). The heating was done by the grinding action. The slurry was allowed to cool in an agitated vessel. The resulting slurry had a fluid, smooth, white appearance and is stable toward separation for greater than 2 weeks. The slurry viscosity was found to be 590 cP (0.59 Pa-s) and the final monomodal average particle size was 240 μm (with no evidence of a peak at 17 μm). Percent dissolution was found to be 92%. The slurry was held at 130° F. (54° C.) for 2 months with only slight separation and no cold flow tendencies or increase in particle size.

Example 8

A 2.8 g quantity of Carbowax 4000 polyethylene glycol wax (from Union Carbide) was dissolved in 92 g of Hexyl Cellosolve (from Barsol) at 65° C. This solution was added to 111 g of precipitated DRA polymer (as a wet cake containing residual glycol, stearate salts, etc.), plus 0.7 g Hi-Sil 233 precipitated silica (avg. part. size 18 μm, from PPG Industries). The mixture was sheared with a Waring-type blender for 30 seconds. The homogenized slurry was allowed to cool to ambient temperatures while under agitation. The resulting particles had an average particle size of 217 μm and a viscosity of 1200 cP (1.2 Pa-s). No separation was observed after sitting at ambient temperatures for 3 days. The slurry was observed to dissolve rapidly in hexane, giving a "stringy" solution within 5 min. Percent dissolution was found to be 87%.

Example 9

The same preparation method was followed as with Example 8 with the omission of the wax. Significant separation was observed, with the DRA polymer floating.

Temperature corrected viscosity values were measured using a Brookfield DV-II+ viscometer using a T-A spindle at 20 rpm (helical path) at ambient temperature.

Slurry particle size was measured using a Microtrac S3000 with isopropyl alcohol as the carrier. It is not known to what extent the particle size measurement affects the structure of the density-matched polymer particle.

Percent dissolution was measured as follows. A known quantity of polymer is fully dissolved in hexane followed by measurement of drag reduction. Drag reduction (% DR) is determined from the pressure drop over a length of line containing the flowing fluid using the equation, $$\% \, DR = \frac{\Delta P_b - \Delta P_t}{\Delta P_b} \times 100$$

where $\Delta P_t$ and $\Delta P_b$ are the pressure drops with and without drag reducer, respectively. A similar slurry sample is prepared at a known initial concentration in hexane, which is agitated for 10 min, immediately after which time it is filtered to remove any undissolved solids. Percent drag reduction is again measured. Using a double reciprocal, % DR vs. concentration calibration curve based on the set of complete dissolution runs, the % dissolution at 10 min can be determined.

Since it is not possible in practice to exactly match the suspended composite particle density to the carrier density over a broad temperature range, it has been a surprise to find that many slurries formulated by the present methods have remained stable for 7 months despite daily temperature cycles and seasonal variations. It is likewise unexpected that such a composite coating on the surface of the DRA polymer particle would allow for rapid dissolution of the polymer when introduced into a solvent such as hexane.

Hydrocarbon systems to which the DRA compositions of this invention may be applied include, but are not necessarily limited to, any flowing stream that has a notable hydrocarbon component. By "large hydrocarbon component" is meant at least 10 volume percent hydrocarbon or oleaginous material. Hydrocarbon systems include, but are not necessarily limited to, multiphase flowlines (for example oil/water, water/oil, oil/water/gas) in oil and gas production systems, including gas transmission lines (e.g. gas/condensate, gas/condensate/water). It is expected that the invention could apply to any hydrocarbon fluid flowing in a pipeline or well, whether or not water or gas is present. It will be appreciated that by the term "hydrocarbon fluid", it is expected that oxygenated hydrocarbons such as methanol, ethanol, ethers, and the like are included within the definition. Thus, multiphase hydrocarbon-containing systems (e.g. oil/water, oil/gas, oil/water/gas), such as oil production flow lines and gas export lines are primary applications for this technology.

However, it will also be appreciated that the basic concept of the invention could be applied to the design of drag reducing agents for aqueous systems, with judicious adjustment of the materials used as the core particles, density-matching materials (or waxes) and optional relatively high density particulates.

In one non-limiting embodiment of this invention, the grinding for producing particulate polymer drag reducing agent may be conducted at non-cryogenic temperatures, and as noted the grinding activity can increase the temperature of the slurry sufficient to disperse and distribute the wax or density matching material. For the purposes of this invention, cryogenic temperature is defined as the glass transition temperature ($T_g$) of the particular polymer having its size reduced or being ground, or below that temperature. It will be appreciated that $T_g$ will vary with the specific polymer being ground. Typically, $T_g$ ranges between about −10° C. and about −100° C. (about 14° F. and about −148° F.), in one non-limiting embodiment. As noted, in another non-limiting embodiment of the invention, the grinding for producing particulate polymer drag reducing agent is conducted at ambient temperature, although the temperature will rise during grinding, of course. Poly(alpha-olefin) is one preferred polymer in one non-limiting embodiment of the invention. In one non-restrictive embodiment of the invention, the polymer may have its size reduced in one step, or may have its size reduced in multiple steps or stages. For instance, the polymer may be granulated, that is, broken up or otherwise fragmented into granules in the range of about 6 mm to about 20 mm, preferably from about 8 mm to about 12 mm. It is permissible for the granulated polymer to have an anti-agglomeration agent thereon.

Within the context of this invention, the term "granulate" refers to any size reduction process that produces a product that is relatively larger than that produced by grinding or homogenizing. Further within the context of this invention, "grinding" refers to a size reduction process that gives a product relatively smaller than that produced by "granulation". "Grinding" may refer to any milling, pulverization, attrition, or other size reduction that results in particulate polymer drag reducing agents of the size and type that are the goal of the invention.

While grinding mills, particularly attrition mills such as Pallmann attrition mills, Munson centrifugal impact mills, Palmer mechanical reclamation mills, etc. may be used in various non-limiting embodiments of the invention, other grinding machines may be used in the method of this invention as long as the stated goals are achieved.

Many modifications may be made in the compositions and processes of this invention without departing from the spirit and scope thereof that are defined only in the appended claims. For example, the exact nature of and proportions of core particles, density-matching materials or waxes, relatively high density particulates, carrier fluids, etc. may be different from those used here. Other alternative or additional processing techniques may be used or developed to enable the components to be homogeneously blended and work together well, yet still be within the scope of the invention. For instance, an alternative method of placing the density-matching material on the surfaces of the core particles other than precipitation may be used. Additionally, proportions and types of the various components are expected to be optimized for each polymer particles treated, particularly drag reducing polymers.

We claim:

1. A density-matched particle slurry comprising:
   a carrier liquid;
   a plurality of core particles within the carrier liquid;
   a density-matching material coated on the surfaces of the core particles wherein a majority of the density-matched core particles bearing the density-matching material have a combined density substantially equal to that of the carrier liquid, where the density-matching material is soluble and dispersible in the carrier liquid at a temperature above about 100° F. (about 38° C.); and
   a plurality of relatively high density particulates having a mean particle diameter ranging from about 0.25 to about 20 μm, the relatively high density particulates contacting with the density-matching material or the core particles or both, where the relatively high density particulates increase the density of the density-matched particles to assist in permitting the density of the density-matched core particles bearing the density-matched material to have a combined density substantially equal to that of the carrier liquid
   where the polymer core particles can dissolve in a hydrocarbon within 5 minutes.

2. The density-matched particle slurry of claim 1 where the core particles comprise a polymer.

3. The density-matched particle slurry of claim 2 where the core particles comprise a drag-reducing polymer.

4. The density-matched particle slurry of claim 3 where the drag-reducing polymer particles are polyalpha-olefins.

5. The density-matched particle slurry of claim 1 where the density-matching material at least partially coats at least a majority of the total surface area of the core particles.

6. The density-matched particle slurry of claim 5 where the density-matching material is a wax.

7. The density-matched particle slurry of claim 6 where the wax is selected from the group consisting of
   polyethylene glycol (PEG) homopolymers and copolymers, polypropylene glycol (PPG) homopolymers and copolymers, stearate monoesters and stearate diesters of these polymers and copolymers;
   alcohol and fatty alcohol alkoxylates and mixtures of alkylene oxide ethers and stearate monoesters, stearate diesters, and oleate esters of these polymers and copolymers;
   stearamide;
   ethylene bis-stearamide;
   ethylene glycol distearate;
   stearate and oleate salts;
   fatty acid esters and fatty acid alkoxylates; and
   mixtures thereof.

8. The density-matched particle slurry of claim 1 where the relatively high density particulates are different from the density-matching material and are selected from the group consisting of:
   polyethylene glycol (PEG) homopolymers and copolymers, polypropylene glycol (PPG) homopolymers and copolymers, stearate monoesters and stearate diesters of these polymers and copolymers;
   alcohol and fatty alcohol alkoxylates and mixtures of alkylene oxide ethers and stearate monoesters, stearate diesters, and oleate esters of these polymers and copolymers;
   stearamide;
   ethylene bis-stearamide;
   ethylene glycol distearate;
   stearate and oleate salts;
   fatty acid esters and fatty acid esters alkoxylates;
   polyethylene (PE), oxidized PE and copolymers of PE;
   polypropylene (PP) and copolymers of PP;
   polystyrene and copolymers of polystyrene;
   carbon black and graphites;
   micronized polyphenylene sulfate (PPS), polyphenylene oxide (PPO), polyamides, polyethylene terephthalate (PET), polybutylene terephthalate (PBT), polyvinyl chloride (PVC);
   precipitated and fumed silicas;
   natural clays, synthetic clays, organoclays;
   boric acid;
   sulfates, carbonates, phosphates and oxides of alkali metals;
   sulfates, carbonates, phosphates and oxides of alkaline earth metals; and
   mixtures thereof.

9. The density-matched particle slurry of claim 1 where the core particles have a mean particle diameter ranging from about 10 to about 100 times that of the relatively high density particulates.

10. The density-matched particle slurry of claim 1 where the carrier liquid is a non-solvent for the core particles.

11. The density-matched particle slurry of claim 1 where the liquid is a non-solvent for the density-matching material at ambient temperature.

12. The density-matched particle slurry of claim 1 where the carrier liquid comprises at least one non-hydrocarbon component selected from the group consisting of water, alcohols and fatty alcohols, glycols and diols, glycol ethers, glycol esters, and mixtures of these.

13. A density-matched particle slurry comprising:
    a carrier liquid;
    a plurality of polymer core particles within the carrier liquid;
    a density-matching wax coated on the surfaces of the polymer core particles wherein a majority of the density-matched core particles bearing the density-matching wax have a combined density substantially equal to that of the carrier liquid, where the density-matching material is soluble and dispersible in the carrier liquid at a temperature above about 100° F. (about 38° C.); and
    a plurality of relatively high density particulates having a mean particle diameter ranging from about 0.25 to about 20 μm, the relatively high density particulates embedded with the wax or the core particles or both, where the relatively high density particulates increase the density of the density-matched particles to assist in permitting the density of the density-matched core particles bearing the density-matched material to have a combined density substantially equal to that of the carrier liquid
where the polymer core particles can dissolve in a hydrocarbon within 5 minutes.

14. The density-matched particle slurry of claim 13 where the drag-reducing polymer particles are drag reducing poly-alpha-olefins.

15. The density-matched particle slurry of claim 13 where the density-matching wax is selected from the group consisting of
polyethylene glycol (PEG) homopolymers and copolymers, polypropylene glycol (PPG) homopolymers and copolymers, stearate monoesters and stearate diesters of these polymers and copolymers;
alcohol and fatty alcohol alkoxylates and mixtures of alkylene oxide ethers and stearate monoesters, stearate diesters, and oleate esters of these polymers and copolymers;
stearamide;
ethylene bis-stearamide;
ethylene glycol distearate;
stearate and oleate salts;
fatty acid esters and fatty acid alkoxylates; and
mixtures thereof.

16. The density-matched particle slurry of claim 13 where the carrier liquid is a non-solvent for the polymer core particles.

17. A hydrocarbon-containing stream having reduced drag comprising:
a hydrocarbon; and
a density-matched particle slurry comprising:
a carrier liquid;
a plurality of core particles within the carrier liquid, where the core particles are soluble in the hydrocarbon, where the carrier liquid is a non-solvent for the core particles;
a density-matching material coated on the surfaces of the particles in a manner sufficient to permit the density of a majority of the density-matched core particles bearing the density-matching materials to have a combined density substantially equal to that of the carrier liquid, where the density-matching material is soluble and dispersible in the carrier liquid at a temperature above about 100° F. (about 38° C.), and where the density-matching material is soluble in the hydrocarbon; and
a plurality of relatively high density particulates having a mean particle diameter ranging from about 0.25 to about 20 μm, the relatively high density particulates contacting with the density-matching material or the core particles or both, where the relatively high density particulates increase the density of the density-matched particles to assist in permitting the density of the density-matched core particles bearing the density-matched material to have a combined density substantially equal to that of the carrier liquid
where the polymer core particles can dissolve in a hydrocarbon within 5 minutes.

18. A water-containing stream having reduced drag comprising:
water; and
a density-matched particle slurry comprising:
a carrier liquid;
a plurality of core particles within the carrier liquid, where the core particles are water soluble, where the carrier liquid is a non-solvent for the core particles;
a density-matching material coated on the surfaces of the particles in a manner sufficient to permit the density of a majority of the density-matched core particles bearing the density-matching materials to have a combined density substantially equal to that of the carrier liquid, where the density-matching material is soluble and dispersible in the carrier liquid at a temperature above about 100° F. (about 38° C.), and where the density-matching material is water soluble; and
a plurality of relatively high density particulates having a mean particle diameter ranging from about 0.25 to about 20 μm, the relatively high density particulates contacting with the density-matching material or the core particles or both, where the relatively high density particulates increase the density of the density-matched particles to assist in permitting the density of the density-matched core particles bearing the density-matched material to have a combined density substantially equal to that of the carrier liquid.

* * * * *